UNITED STATES PATENT OFFICE.

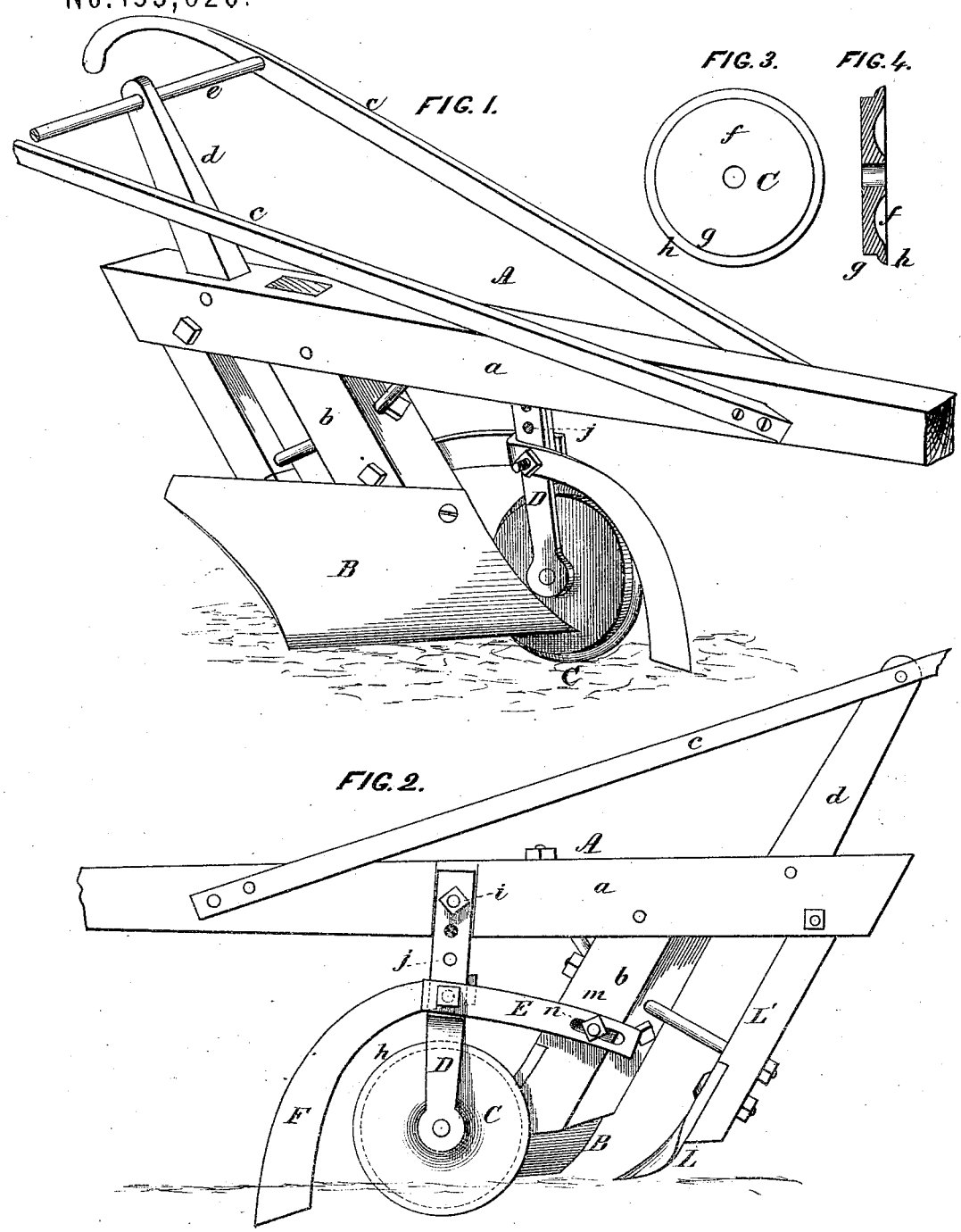

OBADIAH M. SHEMWELL, OF GREENVILLE, NORTH CAROLINA.

IMPROVEMENT IN CULTIVATORS.

Specification forming part of Letters Patent No. 153,620, dated July 28, 1874; application filed June 10, 1874.

*To all whom it may concern:*

Be it known that I, OBADIAH M. SHEMWELL, of Greenville, in the county of Davidson and State of North Carolina, have invented certain new and useful Improvements in Cultivators, of which the following is a specification:

This invention has reference to an agricultural implement which is designed to be used for scraping and cultivating cotton, corn, and also as a turn and subsoil plow. The invention consists in the combination, with a vertically-adjustable gage and fender-wheel having a vertical and horizontal adjustment, of a colter attached to the standard carrying said wheel, and projecting in front of the latter, the purposes of which are hereinafter fully set forth.

In the accompanying drawings, Figure 1 is a perspective view of the implement, looking in on the plow-share. Fig. 2 is an elevation of the land-side part of the implement. Fig. 3 is a side view of the gage and fender-wheel, and Fig. 4 is a sectional view of the same.

A designates an ordinary cotton or corn cultivator or plow, *a* being the beam; *b*, the standard; *c*, the handles; *d*, the handle-support; and *e*, the connecting-bar of the handles. The plow represented in the present instance is a scraper, B; but shares, sweeps, and other forms of plows may be employed, according to the kind of work to be performed. C is a rotating gage and fender-wheel, which is located at the land-side portion of the scraper or plow, and relatively to the point or share of the same, in such a manner as to be adjustable in a horizontal and vertical direction, for the object hereinafter stated. The wheel C, which is composed of a web or body, *f*, having a rim, *g*, and a flange, *h*, at the outer edge of the same, is journaled in the lower end of a bifurcated standard, D, attached at its upper end to the plow-beam by a bolt, *i*, passing through one of a series of holes, *j*, in the standard, and through the beam. The series of holes *j* are designed to permit the standard to be adjusted vertically to elevate or lower the gage or fender wheel in respect to the point or share of the plow or scraper. This adjustment of the wheel will cause the plow to run deep or shallow, according to the position of the wheel. In addition to the vertical adjustment of the wheel rendered possible by the construction above described, the same can also be moved forward or backward, or in a horizontal or longitudinal direction, in respect to the plow, and this without changing the relative height of the wheel in respect to the point or share of the plow. This horizontal adjustment of the wheel is effected by means of a curved brace or bar, E, attached at its forward end to the standard D, adjustably secured, and at its rear end to the standard of the scraper or plow by means of a clamping-bolt, *m*, which passes through a slot, *n*, made in the brace. By loosening the nut of said bolt *m* the standard and wheel can be moved to the extent of the slot in the brace. A curved colter or knife, F, is attached to the standard D, so as to extend downward in front of the wheel for cutting weeds, grass, &c., and to assist in guiding the progress of the implement through the ground.

By means of the adjustable gage and fender-wheel, applied as shown, the clogging or choking of the plow by weeds or trash will be prevented, for said wheel will relieve itself of all accumulated matter and obstructions by passing them over the edge of the share of the plow, close by the side of the flange of the wheel.

It will be understood that in practice the rim of the wheel is never let down below the share, and that when the rim of the wheel is on a level with the share, the plow or scraper will work very shallow; yet some space is retained between the face of the wheel and the share, which prevents the aforesaid choking by permitting the passage of all weeds and trash. In cultivating or plowing lands containing obstructions to a good extent it is necessary to work the wheel farther forward than in lands containing comparatively a small amount of obstructing matter.

In the present instance I have combined with the cultivating or scraper plow a subsoil attachment, located in rear of the plow and gage-wheel, and consisting of a subsoil tooth or point, L, applied to the lower end of a suitably-braced standard, L. The operation of cultivating and subsoiling can thus be performed simultaneously, but the subsoiler may be removed when not required.

What I claim as my invention is—

The combination, with the gage and fender-wheel, having a vertical and a horizontal adjustment, of the colter attached to the vertical standard, carrying the gage-wheel and projecting in front of the latter, whereby said wheel and colter are capable of a simultaneous vertical and horizontal adjustment, substantially as herein shown and described.

In testimony that I claim the foregoing I have hereunto set my hand.

OBADIAH M. SHEMWELL.

Witnesses:
 JOHN A. HEDRICK,
 F. W. SCOTT, Jr.